United States Patent [19]

Fanning

[11] 4,265,410
[45] May 5, 1981

[54] MACHINE FOR WINDING STRIP MATERIAL

[75] Inventor: William J. Fanning, Glen Ellyn, Ill.

[73] Assignee: Western Electric Company, Incorporated, New York, N.Y.

[21] Appl. No.: 142,590

[22] Filed: Apr. 21, 1980

Related U.S. Application Data

[62] Division of Ser. No. 974,153, Dec. 28, 1978, Pat. No. 4,229,865.

[51] Int. Cl.³ .................. B65H 39/16; B65H 17/02
[52] U.S. Cl. .................................. 242/56.1; 242/67.2; 242/75.52
[58] Field of Search ............. 242/67.1 R, 67.2, 56.1, 242/56.2, 75.44, 75.45, 75.52; 29/25.42

[56] References Cited

U.S. PATENT DOCUMENTS

| | | | |
|---|---|---|---|
| 3,030,912 | 4/1962 | McGraw | 242/67.2 X |
| 3,201,056 | 8/1965 | Fanning | 242/56.1 |
| 3,432,901 | 3/1969 | Fanning | 242/56.1 |
| 3,787,690 | 1/1974 | Neff | 242/75.52 X |
| 3,815,188 | 6/1974 | Pietro | 242/56.1 |
| 4,003,112 | 1/1977 | Miller | 242/56.1 |
| 4,229,865 | 10/1980 | Fanning | 242/56.1 |

Primary Examiner—Edward J. McCarthy
Attorney, Agent, or Firm—R. P. Miller

[57] ABSTRACT

A pair of very thin dielectric films, each completely metallized on one side, are positively advanced over a pair of drums of a machine while the films are laser scribed and slit to form two sets of film strips each of which has a laser scribed capacitor plate formed thereon. The film strips forcibly emanating from the drums pass through a number of tension responsive devices and are wound on one of a pair of successively positioned takeup split mandrels. A compensating mechanism is included in one of the drum drives to vary the speed of the drums to compensate for the difference in diameters of the wound convolutions of one set of film strips with respect to the other set so that a succession of capacitor blanks are snugly wound with consistent geometric size and capacitance value.

17 Claims, 15 Drawing Figures

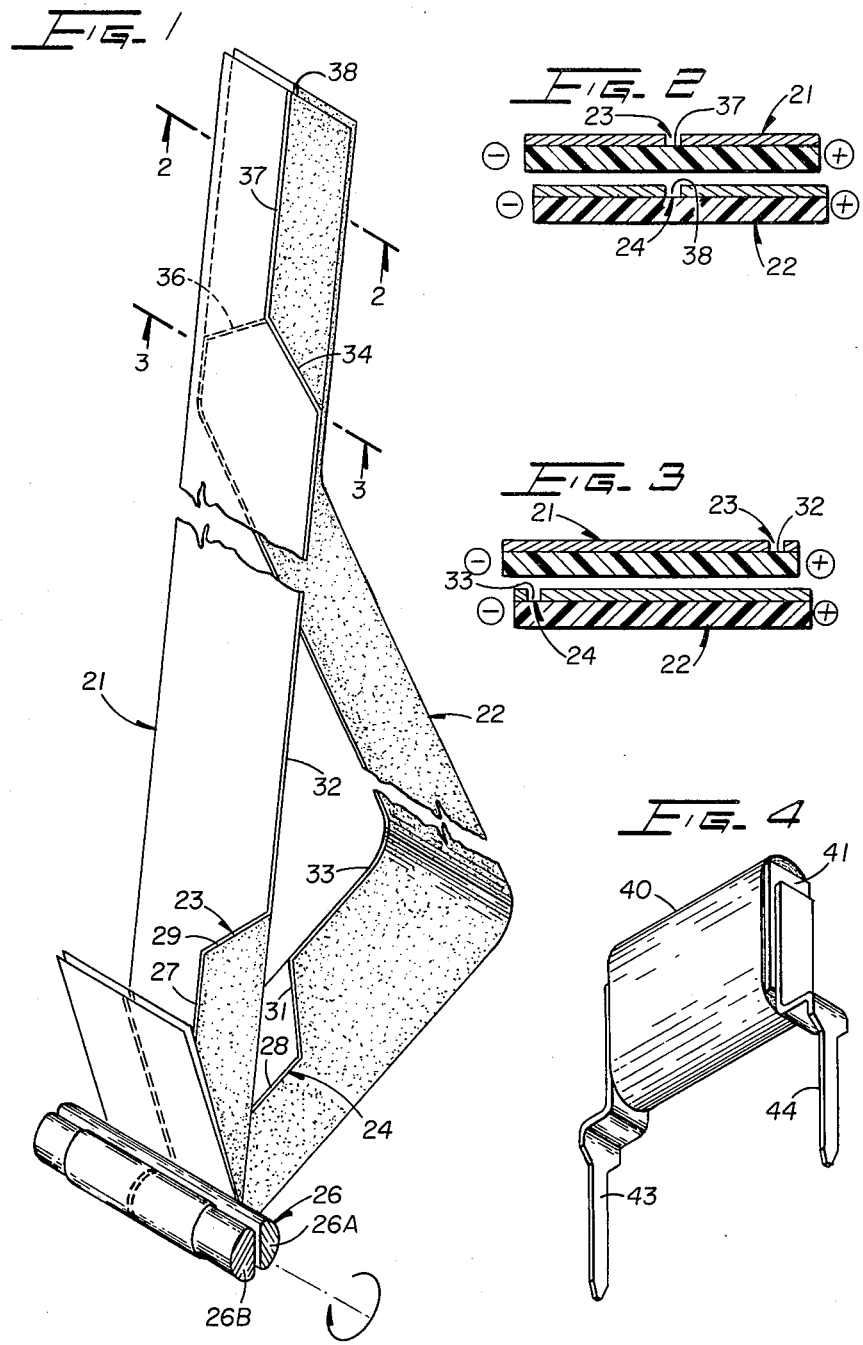

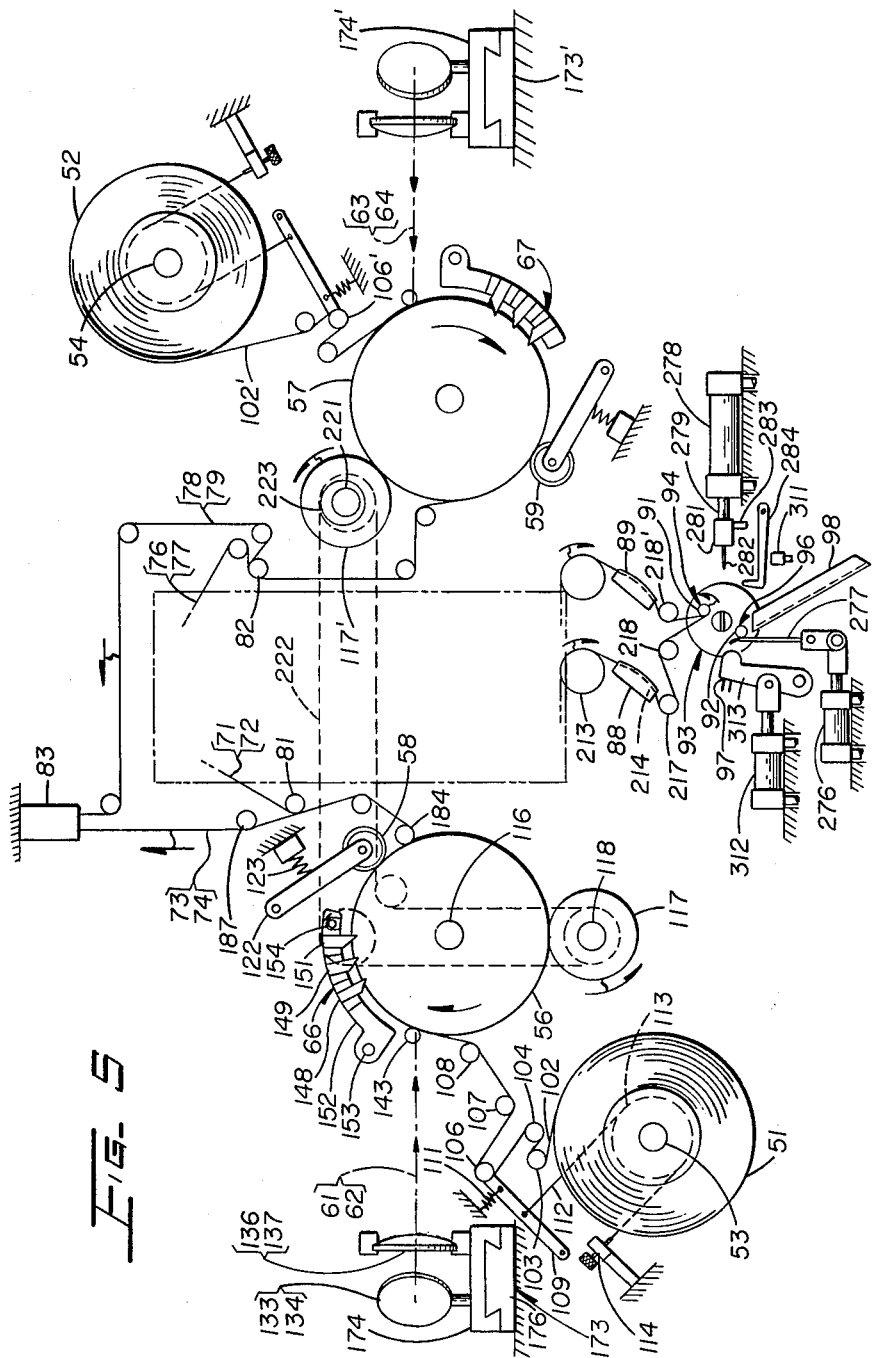

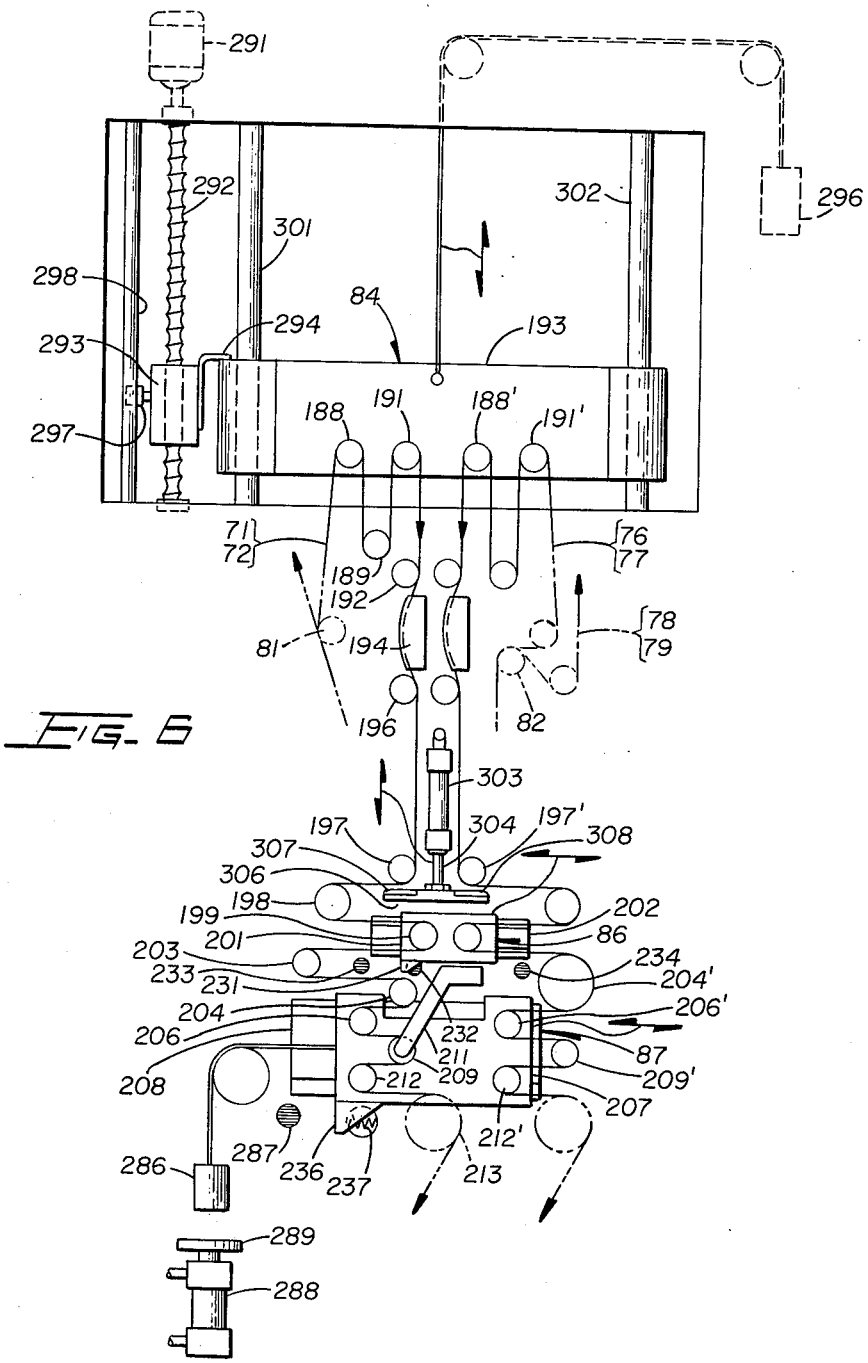

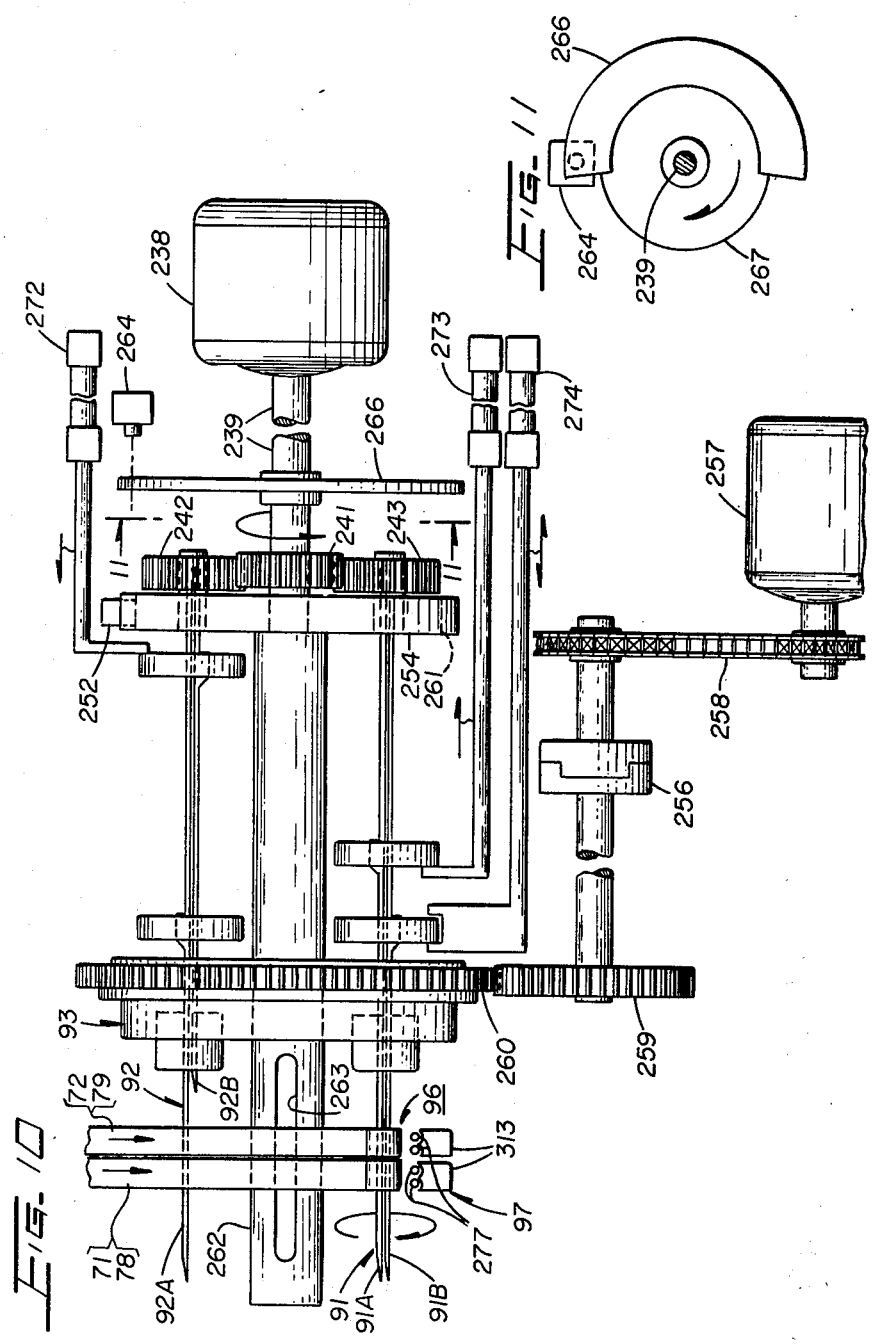

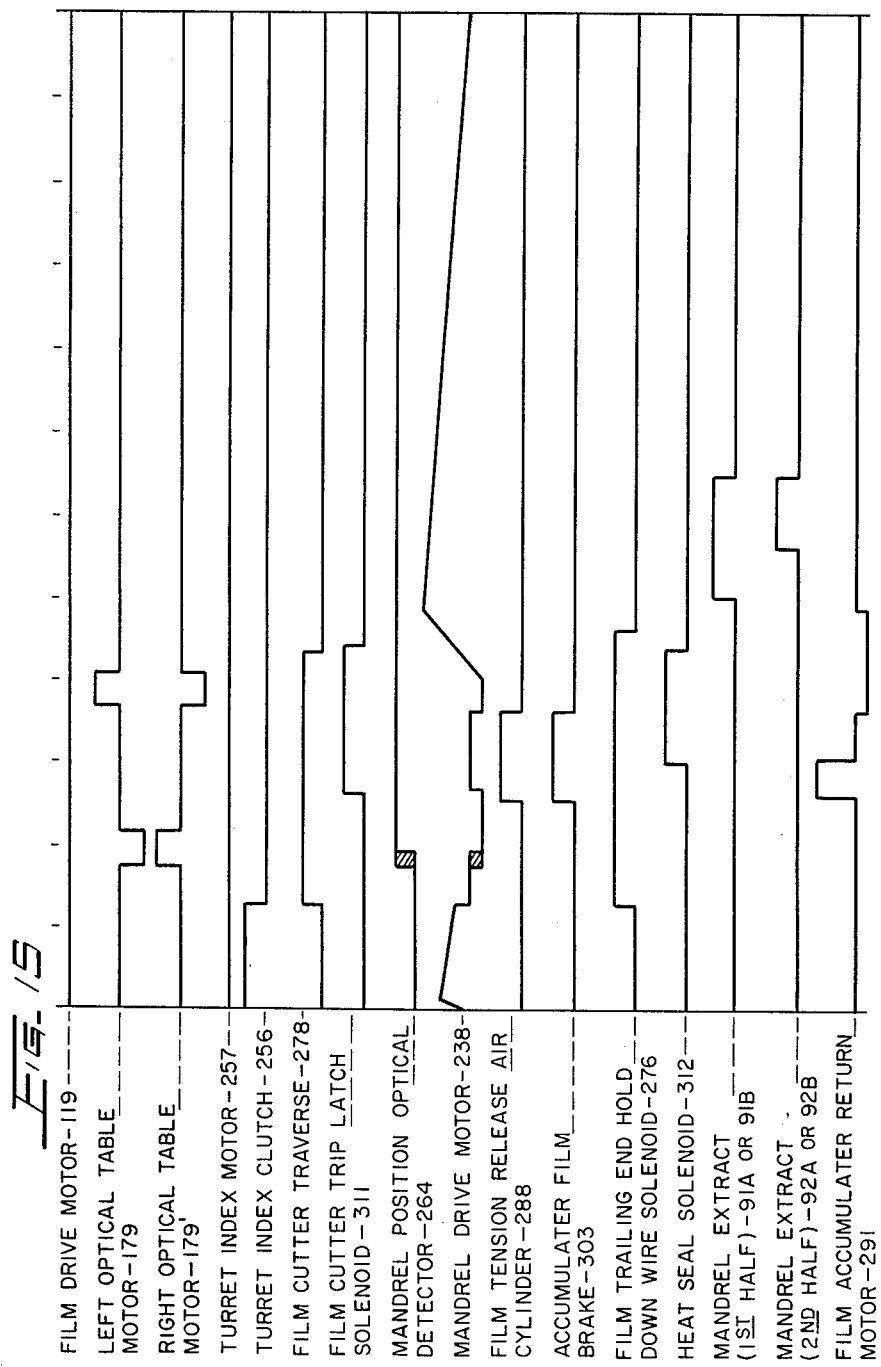

MACHINE FOR WINDING STRIP MATERIAL

This is a division of application Ser. No. 974,153 filed Dec. 28, 1978, now U.S. Pat. No. 4,229,865.

CROSS-REFERENCE TO RELATED APPLICATIONS

W. J. Fanning and O. T. Masopust, Jr., Application Ser. No. 974,182, now U.S. Pat. No. 4,240,127 entitled METALLIZED FILM CAPACITOR AND METHOD OF MANUFACTURE filed on even date herewith and assigned to the Western Electric Company, Incorporated.

TECHNICAL FIELD OF THE INVENTION

This invention relates to a machine for laser scribing and winding metallized film strips into capacitor blanks which are subsequently terminated to form capacitors, and more particularly to a machine for laser scribing capacitor plate areas on a pair of metallized films and then winding the films to form miniature capacitor blanks having precise electrical characteristics.

BACKGROUND OF THE INVENTION

With the advent of semi-conductor technology, current circuit design requires utilization of many types of smaller and smaller circuit components which are assembled on printed circuit boards or substrates. Numerous miniature circuit elements and combinations thereof have been encased in small machine insertable packages known as DIPS (Dual In-Line Packages). Not only is there a need for packaged active circuit elements but also a need for passive elements, such as capacitors and resistors. One type of miniature capacitor that lends itself to packaging for machine insertion is the ceramic capacitor. However, ceramic capacitors are subject to several deterrents, such as temperature sensitivity, non-self healing, capacitor degradation over a period of time, and the character of failing as a short circuit upon breakdown. A more reliable capacitor not subject to the aforementioned deterrents is the metallized film rolled capacitor. Use of rolled film capacitors has been curtailed because of their relatively large size, cost and unadaptability to miniature packaging for machine insertion.

The present invention is concerned with a machine for producing miniature metallized film rolled capacitors which are very small, inexpensive and suitable for packaging into small cases that may be readily machine inserted in a printed circuit board.

Rolled metallized film capacitors are usually manufactured by masking a plastic film being advanced through a vacuum metallizer which deposits a thin layer of metal, such as zinc or aluminum, through the mask onto one exposed surface of the film to form stripes of non-metallized areas interposed between longitudinally extending metallized areas. The metallized film is cut along the middle of the unmetallized stripes and the middle of the metallized areas to provide pairs of metallized film strips each having a non-metallized margin. A pair of films with opposed unmetallized margins are wound together with the metallized surface of each film abutting the unmetallized surface of the other film. The winding is such that there is a misregistration of the margins so that the metallized edges of the wound film strips extend slightly beyond the unmetallized edges. Near the completion of the winding operation, a strip of non-coated dielectric material is inserted and wound between the peripheral windings of the metallized strips. The inserted strip permits the heat sealing of the outer convolutions to preclude unraveling without short circuiting the metallized portions of the wound film. These rolled capacitor blanks are metal sprayed with heat fusible metal on opposite ends and then wax impregnated for moisture protection. Suitable electrical terminals are then attached to the metal sprayed ends.

During the metallization of the film, certain portions of the metal have a tendency to work under the mask so that there is no finite line of demarcation between the metallized and unmetallized stripes. In winding a pair of such films, an added amount of width of unmetallized margin area is provided to insure that any metal projecting into the non-metallized margin does not short circuit with the metal on the other film. Further, during the various prior art fabricating steps, the films are wound and rewound resulting in a weave lay or lateral overlay of adjacent convolutions which necessitates an added amount of misregistration in order to obtain the desired amount of metallized surface area overlap to form the capacitor plates. This added misregistration results in a relatively long capacitor blank.

Currently, the usual type of winding machine winds a succession of capacitor blanks on a pair of winding mandrels mounted in a turret. The turret is rotated to move the mandrels successively into a winding position where the mandrel is rotated to wind a pair of films by drawing the films from a pair of supply rolls. The metallized films must be of sufficient thickness and strength so as to preclude breaking upon impartation of the mandrel winding forces. The use of relatively thick films results in the production of a capacitor blank having a relatively large diameter.

One type of winding facility for making metallized film resistor-capacitor networks is shown in U.S. Pat. No. 3,939,440 to R. D. Berg et al. In this patent a pair of metallized films with opposed unmetallized margins are simultaneously wound on a commercial capacitor winder identified as Model SAM 2901A capacitor winder obtainable from E. W. Barton Co., San Fernando, Calif. In this patent there is described a method of laser scribing the metallized surface to form resistive paths that in conjunction with the non-scribed metallized surfaces form a resistance capacitance network.

SUMMARY OF THE INVENTION

This invention contemplates, among other things, a low friction winding machine wherein a pair of metallized films are positively advanced toward a winding mandrel while laser facilities scribe the films to form a pair of precise capacitor plate areas.

More particularly, a pair of films completely metallized on one surface of each film are advanced over a pair of positively driven drums. As each film passes over a drum, a laser beam impinges on the metallized surface to scribe a patterned continuous line which defines one distinct plate of a capacitor. Immediately following the laser scribing operations, the films are edge trimmed to exact widths. Next, the films are advanced by the drums toward a number of tension sensitive facilities to a mandrel which is rotated to snugly wind the films together so that the metallized and laser scribed surface of each film abuts the non-metallized surface of the other film. The films are wound with a small amount of misregistration so that the completely metallized edges furthest from the scribed margin lines appear at opposite ends of the wound capacitor blank. During subsequent manufacturing operations, suitable terminals are attached to the opposite ends of the capacitor blank to form a capacitor.

The utilization of the laser scribing techniques eliminates the need for non-metallized margins and the subsequent multiple handling, winding and rewinding operations required by the prior art techniques. Inasmuch as the laser scribing and trimming are precision operations performed on the drums, the amount of needed misregistration of the wound films can be greatly reduced. Further, it may be appreciated that the films are being force fed toward the winding mandrel and, hence, the tension imparted to the films by the rotating mandrel is minimized. With this type of winding facility it becomes possible to wind very thin and narrow metallized strips to form miniature capacitor blanks. Further, by carefully controlling the tension, precise, repetitive capacitance values are attained as well as consistency in geometric size. Families of capacitors may be easily made without changing the geometric size of the wound capacitor blank by merely changing the laser scribed patterns.

BRIEF DESCRIPTION OF THE DRAWING

Other features and advantages of the present invention will be apparent upon consideration of the following detailed specification and the drawings wherein FIG. 1 is a schematic showing of a pair of metallized film strips that have been laser scribed and partially wound by the machine of the present invention;

FIG. 2 is a cross-sectional view taken along line 2—2 of FIG. 1 illustrating an application of electrical potential to a pair of laser scribed film strips that have been wound and terminated to form a capacitor;

FIG. 3 is a cross-sectional view taken along line 3—3 of FIG. 1 illustrating the electrical potentials and charges on a pair of laser scribed film strips that have been wound to form the main capacitor windings of a capacitor;

FIG. 4 is a perspective view of a capacitor blank fabricated by the machine of the present invention wherein the blank has been flattened and terminated to form a capacitor;

FIG. 5 is a front schematic view of a machine for laser scribing, slitting and winding pairs of metallized film strips to form capacitor blanks in accordance with the principles of the present invention;

FIG. 6 is a schematic view of an accumulator and tension responsive facilities included in the block diagram appearing in the center of FIG. 5;

FIG. 10 is a schematic side view of mechanisms for rotating a pair of winding mandrels and for orbiting mandrels from and into winding and discharge stations together with facilities for selectively withdrawing the mandrels into and from a turret;

FIG. 11 is a front view of a shutter disc and photodetector for sensing the position of the mandrels;

FIG. 15 is a timing diagram depicting the time relationship between certain of the more salient components of the machine during each cycle of operation.

DETAILED DESCRIPTION

Figure 7:
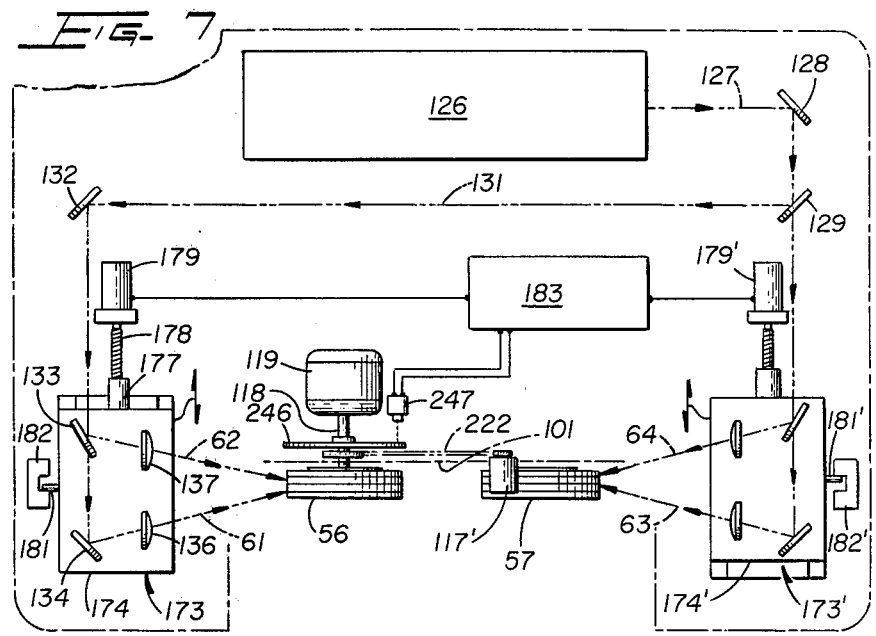
FIG. 7 is a schematic top view of the machine shown in FIGS. 5 and 6 particularly illustrating a laser scribing system and a motor drive mechanism for advancing metallized films over a pair of drums.

In order to better appreciate the more salient features of the machine, an understanding must be had of the product produced by the machine. The product produced by the machine may be a laser scribed metallized film capacitor blank of the type more fully disclosed in the above-identified application to W. J. Fanning and O. T. Masopust, Jr. filed on even date herewith. A typical product is disclosed in FIGS. 1, 2 and 3 which show a pair of films 21 and 22 that are laser scribed along continuous lines 23 and 24 and wound on a split mandrel 26. The films 21 and 22 are completely metallized across single surfaces thereof. The film may be constructed of a polycarbonate plastic or a polyester plastic such as sold under the trademark Mylar ® polyester film. The film may be 0.00008" thick with a deposited metal of zinc in the thickness of $1.5 \times 10^{-6}$ inches. The width of the film may be 0.164" wide; thus, it will be appreciated that a very small rolled film capacitor blank will result from the winding of two such films together. A rolled and subsequently flattened capacitor blank may have dimensions such as 0.172" wide, 0.190" high and 0.065" thick.

The continuous metal-free lines 23 and 24 are formed by controlling a pair of impinging laser beams to scribe the metallized surfaces in the disclosed pattern. The forward sections of a pair of films is captivated between halves of the mandrel 26 designated by the reference numerals 26A and 26B. These forward sections of the film strips extending through the mandrel halves are wound back and in with the leading sections of the remainder of the films. The laser scribing is such that line sections 27 and 28 are formed along the approximate midsections of the strip so as to be in overlaying relation. However, these lines do not extend down the exact midsection of the strip because the films are wound with a slight degree of misregistration; that is, there is approximately a 0.01" offset between the edges of adjacent convolutions. The important criteria is that the line sections 27 and 28 overlay each other during the initial winding of the capacitor blank.

The continuous lines 23 and 24 are diverted along scribed lines 29 and 31 toward opposed margins, whereafter the lines run along sections 32 and 33. These lines may extend along a margin portion of the respective films or along the edges of the films. Substantial portions of the films are scribed with these margin lines. Near the conclusion of the winding operation, the lines 23 and 24 are again diverted along line sections 34 and 36 to positions near the midsection of the respective films, whereafter the lines are laser scribed to extend in overlying relation along line sections 37 and 38. When the films are wound together, the resulting capacitor blank may be terminated as shown in FIG. 4 which illustrates a capacitor blank that is flattened into a rectangular-shaped body.

In fabricating a capacitor from a rolled film blank 40, porous heat fusible end electrodes 41 are formed on opposed ends of the blank to contact the nonscribed metallized overlaying margins of the wound film strips. The blank is vacuum impregnated with wax to provide a moisture seal, and then terminal leads 43 and 44 of tinned phosphor bronze may be bonded to the heat fusible end electrodes 41 to complete the capacitor.

When the leads 43 and 44 are connected in a charging circuit, negative potential will be applied to the left-hand margins of the metallized films and positive potential applied to the right-hand marginal portions of the metallized films as shown in FIGS. 1, 2 and 3. More particularly, negative potential will be impressed on all portions of the metallized films to the left of the laser scribed lines 23 and 24, while positive potential will be impressed on all portions of the metallized films to the right of lines 23 and 24. Inasmuch as line sections 27 and 28 and line sections 37 and 38 of the adjacent convolutions of the initial and final windings of the capacitor are in overlaying relationship, the overlaying metallized surfaces to the left of these scribed lines have impressed thereon the same negative potential, while the overlying metallized surfaces to the right of these lines have impressed thereon the same positive potential; thus, the adjacent initial or core convolutions and the adjacent final or peripheral convolutions of the two metallized films are at the same potential and will not exhibit a significant coupling capacitance effect.

Referring to FIG. 3, which shows a cross-sectional view of two adjacent convolutions of metallized film forming the bulk of the capacitor windings, it will be noted that the large metallized area to the left of scribed line 32 has negative potential impressed thereon while the large metallized area to the right of the scribed line 33 has positive potential applied thereto. The overlaying portions of these films having opposite potentials applied thereto will be charged and will exhibit a capacitance effect. It will be noted that the small margin of the metallized film to the left of line 33 may have negative potential applied thereto which is the same as the potential applied to the underlying and overlying metallized surfaces of the adjacent convolutions so that this small marginal film area will not be charged.

During the manufacture of a rolled film capacitor blank by a machine, such as forming the subject matter of the present invention, it is convenient to wind the metallized films on a split mandrel having halves which are sequentially withdrawn and which may slice through and damage several convolutions. Inasmuch as these inner convolutions are at the same potential, no change or shorting will be made in the overall capacitance of the capacitor if the inner convolutions are cut, which capacitance is essentially determined by the overlying metallized surfaces between the scribed lines 32 and 33.

Another manufacturing step contemplates the heat fusing of the outer convolutions to seal and preclude the unraveling of the convolutions. The heat action will damage several of the outer convolutions, but inasmuch as these convolutions have impressed thereon equal potentials and these sections are, in effect, charge isolated from the main capacitor windings, there is no significant change in the charging characteristics of the capacitor so as to alter the capacitance value.

Considering the general overall operation of the machine shown in the other figures of the drawings, and with particular reference to FIGS. 5 and 6, there is shown a machine for simultaneously manufacturing and winding two capacitor blanks at a time. A pair of supply rolls 51 and 52 of thin plastic films 102 and 102' each having one side completely metallized or metal coated are mounted on a pair of arbors 53 and 54. The films are withdrawn from the rolls by a pair of rotating drums 56 and 57 cooperating with a pair of spring-biased pinch rollers 58 and 59. As the films pass over the drums with the metallized surfaces exposed, two pairs of laser beams 61, 62, 63 and 64 simultaneously laser scribe patterns of demetallized lines of the type shown in FIG. 1.

Figure 8:
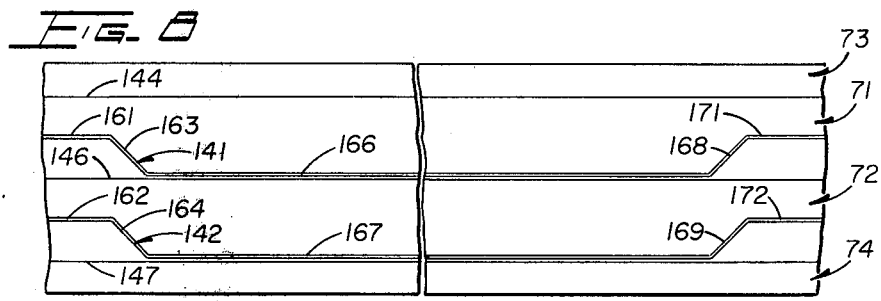
FIGS. 8 and 9 show two metallized film strips which have been laser scribed in distinctive patterns and which have been slit while passing over the pair of drums.
Figure 9:
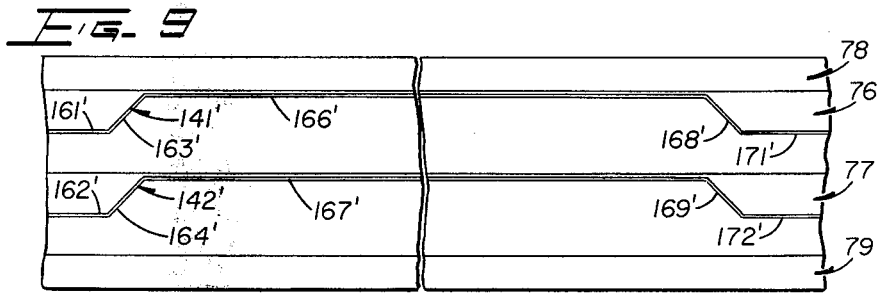

The advancing films are slit by two sets of knives 66 and 67 individually associated with each drum to form two laser scribed strips 71 and 72 (see FIG. 8) and two scrap strips 73 and 74 on drum 56, and two laser scribed 76 and 77 (see FIG. 9) and two scrap strips 78 and 79 on drum 57. The emanating strips pass over separation rollers 81 and 82 and scrap strips 73, 74, 78 and 79 pass to a vacuum takeup tube 83, while strips 71, 72, 76 and 77 pass through an accumulator 84 (see insert drawing FIG. 6) and through a tension balance responsive device 86 which, in effect, detects differences in the amount of film strips being advanced by the drums.

Next, the film strips pass through a weight biased tension responsive device 87 and then over a pair of guide shoes 88 and 89 (see FIG. 5) which are positioned to impart a slight amount of misregistration between the film strips as the strips are wound on one or another of a pair of split winding mandrels 91 and 92. The mandrels 91 and 92 are rotatably and slidably mounted on a turret 93. The turret and mandrels are parts of a modified commercial winding head turret assembly manufactured by E. W. Barton Company, San Fernando, Calif., as Parts No. 2909-901 and 2909-506.

Upon completion of the winding of a capacitor blank on a mandrel, such as mandrel 91, the turret 93 is rotated to orbit the mandrel 91 from a winding station designated by the reference numeral 94 to a discharge station designated by the reference numeral 96, while the mandrel 92 is orbited from the discharge station into the winding station. During the winding of a capacitor blank, the tension sensing device 87 responds to variations in tension or amount of available strip material to control the speed of a servomotor used to drive the mandrels. Tension control is is important because the films are very thin and may wrinkle or break. Further, it is important that the convolutions are wound with substantially constant tension to insure that the compressive forces between successive convolutions do not vary so that the convolutions are snugly wound. By maintaining the compressive winding forces constant, capacitor blanks of uniform geometric size and precise capacitance value are repetitively produced.

During the winding of the final wraps on a pair of capacitor blanks, the outer convolutions are heat sealed by a selectively operated heater device 97. Finally, the mandrel of the capacitor in the discharge station 96 is withdrawn, one half at a time, so that the completed pair of capacitor blanks drop into a discharge chute 98.

Considering now the details of construction and operation of the machine, and with particular reference to FIGS. 5, 6 and 7, the arbors 53 and 54 are mounted on a frame 101 which is a large plate shown in FIG. 7, but for clarity sake is not shown in FIGS. 5 and 6. However, it will be understood that the frame plate 101 lies in the plane of the drawing sheets showing FIGS. 5 and 6, and certain portions of the frame are illustrated therein by ground lines while other portions are illustrated by lines denoting openings in the frame.

A metallized film 102 is paid off of the supply roll 51 around a pair of guide rollers 103 and 104, and then about a tension sensing roller 106 to another pair of guide rollers 107 and 108. Tension sensing roller 106 is mounted on the free end of a pivot arm 109 which is urged by a spring 111 anchored to the frame of the machine. Attached to the arm 109 is a brake band 112 running about a brake wheel 113 coupled to the arbor 53. The brake band 112 is also secured to the machine frame by an adjustable mount 114. As the tension varies in the paid off metallized film 102, the spring-urged roller 106 will move to control the brake band in exercising a braking action on the supply roll to control the film payout and prevent a free overrun.

Metallized film 102 passes from the approach guide roller 108 to tangentially engage the periphery of the drum 56. The drum 56 is rotatably mounted by suitable bearings on a shaft 116 which, in turn, is mounted in the frame 101.

A drive roller 117 having a peripheral surface constructed of a friction imparting resilient material (e.g., rubber or polyurethane) is secured to a drive shaft 118 which extends through the frame to be driven by a constant speed film drive motor 119 (see FIG. 7). The periphery of the roller 117 bears against the periphery of the drum 56 to positively rotate the drum in a clockwise direction. The drum may be constructed of a highly polished stainless steel.

During the traverse of the metallized film 102 over the periphery of the drum 56, the pinch roller 58 holds the film tightly against the drum periphery to insure a positive advance of the film while preventing any tendency of air to lift the film from engagement with the drum. The pinch roller is provided with a slightly resilient peripheral surface and is rotatably mounted on the end of a pivot arm 122 which is urged by a spring 123 to hold the roller in firm engagement with the film.

Shortly after the film is engaged by the drum 56, the metallized surface is exposed to the laser beams 61 and 62, see also FIG. 7. As shown in FIG. 7, a commercial Q switched Nd:YAG laser 126 generates a polarized laser beam 127 having a constant pulse rate which strikes a mirror 128 to reflect the beam onto a half mirror 129. Half of the laser beam is reflected by the mirror 129 as a beam 131 that is impinged on another mirror 132, which reflects the beam onto a half mirror 133 which functions to divert a portion of the laser beam to form the laser scribing beam 62. The remainder of the laser beam is impinged on a mirror 134 which functions to deflect the laser beam as laser scribing beam 61.

Lenses 136 and 137 are provided to spot focus the laser beams 62 and 61 approximately against the metallized film 102. The laser source 126 is of a pulsating type which is operated at such a frequency so as to provide a number of pulses which form a train of overlapping, metal evaporating spots on the advancing film 102. The degree of demetallizing spot overlap is attained by synchronizing the pulse rate of the laser with the speed of rotation of the drum 56.

The laser beams act to form, in effect, two scribed lines 141 and 142 (see FIG. 8) of overlapping lased spots on the metallized surface of the film 102. These lines are of the types and configurations shown in FIG. 1 and there designated by the reference numeral 23. As the lines 141 and 142 are being lased, the evaporated metal is picked up and exhausted through a vacuum vent tube 143 (see FIG. 5).

Following the scribing of the lines 141 and 142, the film is slit along lines 144, 146 and 147 by the knife set 66 which includes a series of three blades 148, 149 and 151 mounted in stepped or echeloned positions on an arcuate support 152 which is pivotally mounted on a pin 153. The forward portion of the arcuate support 152 is slotted to receive a fastener 154 that serves to lock the support and position the blades 148, 149 and 151 within three peripheral, shallow grooves formed in the surface of the drum 56. The three blades function to sever the film 102 into four strips, the outer two of which are designated by the reference numerals 73 and 74 and are considered to be scrap. The metallized surfaces of the inner two strips designated 71 and 72 receive the impingement of the laser beams 61 and 62 which form the pattern scribed metal-free lines 141 and 142.

At the start of manufacture of a pair of capacitor blanks, the laser beams 61 and 62 are directed to scribe lines 161 and 162 (see FIG. 8) along the approximate midsections of the metallized film strips 71 and 72. The position of lines 161 and 162 is selected to overlie similar lines being formed by the laser beams 63 and 64 impinging on the metallized film passing over the second drum 57 when the second set of film strips are wound on the mandrel 91. After sufficient film strip has been advanced to form a number of core windings of the capacitor blank, the laser beams 61 and 62 are diverted to form demetallized lines 163 and 164, which lines run into demetallized lines 166 and 167 running along first margins of the film strips 71 and 72. The lines 166 and 167 are scribed in the margins or adjacent to the edge of the film strips 71 and 72.

The lengths of these lines are selected so as to form lengths of margin scribed film strips that are sufficient to form the main portion of the capacitor blank windings. Next, the laser beams 61 and 62 are diverted to form laser scribed lines 168 and 169 which run into lines 171 and 172 which again extend along the approximate midsections of the strips 71 and 72. Lines 171 and 172 are formed to overlie similar lines formed by laser beams 63 and 74 on the film strips manufactured on the drum 57 when the two sets of film strips are wound on the mandrel 91.

The diversion of the lines scribed by the laser is obtained by shifting a first optical system generally designated by the reference numeral 173 (see FIG. 7). This optical system includes the mirrors 133 and 134 and the lenses 136 and 137, all of which are mounted on a slide 174 that is bottom slotted to ride on a dove-tail way 176 (see FIG. 5). Secured to the slide 174 is an encased ball nut 177 that rides in the threads of a screw 178 driven by an optical table servomotor 179. A stop pin 181 extends from the slide 174 into a slot formed in a stationary block 182 to limit the reciprocating traverse of the slide 174. The motor 179 is selectively operated by a controller 183 which includes a programmable section to control the motor to generate the pattern-scribed lines 141 and 142. The controller 183 may be any of a number of commercially available programmed controllers, such as Texas Instruments Model STI 1023 sequencer.

Returning now to a further consideration of the advance of the slit film 102 over the drum 56, it should be noted that the film is positively and precisely held to the drum by the pinch roller 58. Inasmuch as the scribed strips 71 and 72 are being manufactured from the film 102 as it passes over the drum, any weaving of the film on the drum is ineffective in varying the positions of the scribed lines 141 and 142 on the slit films 71 and 72. Moreover, the slitting of the film on the drum counteracts not only the effect of weaving on the drum, but also the effect of any random overhang of the convolutions of the film on the supply roll 51.

The slit film strips 71–74 are fed around an exit guide roller 184 and a number of other guide rollers to the separation roller 81 where the scrap strips 73 and 74 are separated from the paths of movement of the film strips 71 and 72 and pass over a guide roller 187 to the vacuum takeup tube 83. Vacuum applied to the tube 88 acts to draw the strips 73 and 74 into the tube where the strips are then directed to a suitable scrap receptacle, not shown.

Slit film strips 71 and 72 move from separation guide roller 81 over a first accumulator guide roller 188 (see FIG. 6) around a fixed guide roller 189 and then over a second accumulator guide roller 191 to a fixed guide roller 192. The accumulator guide rollers 188 and 191 are rotatably mounted on a frame 193 forming part of the accumulator designated by the reference numeral 84.

Next, the film strips 71 and 72 pass through arcuate guide slots formed in a positioning shoe 194, and then move past a series of guide rollers 196,197 and 198 to the tension balance responsive device 86 which includes a tension balancing roller 199 mounted on a shuttle 201 slidably mounted in ways 202 formed in the frame 101. From the shuttle 201, the film strips pass over guide rollers 203 and 204 to a tension responsive device 87 which includes a guide roller 206 mounted on a shuttle 207 which, in turn, is slidably mounted on ways 208 formed in the frame 101. Next, the film strips pass over a guide roller 209 mounted on a bracket 211 secured to the frame 101, whereafter the film strips pass over a second tension responsive roller 212 and a guide roller 213. Exiting from the guide roller 213, the film strips pass through lateral positioning guide slots 214 (see FIG. 5) formed in the shoe 88. From the shoe, the film strips pass over guide rollers 217 and 218 and are thus guided to the winding mandrel 91.

As previously mentioned, the mandrels 91 and 92 are part of a modified commercial winding head. In general, the mandrels are split to provide semicircular halves 91A and 91B and 92A and 92B (see FIGS. 10 and 12) which are modified to provide tapered free ends (see FIG. 10). The adjacent diametric surfaces of the mandrel halves are transversely slotted to provide a small opening to accommodate and anchor the initial convolutions of the film strips during the start of a winding operation.

Inasmuch as the drums 56 and 57 forcefully feed the film strips there is a tendency for slack to be created in the film strips exiting from the drums but the weight biased tension responsive device 87 and rotating mandrel 91 readily take up the slack as it becomes available. As a result of the drums advancing the strips into the machine, a minimum amount of winding force is required to rotate and compactly wind the film strips. As a consequence of this arrangement, the commercial machine was further modified by eliminating outer supports for the rotating mandrels. In prior capacitor blank winding practice, the mandrels are usually supported at both ends when the mandrels are of relatively small diameter.

In order to somewhat reduce and simplify the detailed description, the various guide rollers and other control elements associated with the feed and processing of the second film from supply roll 52 and the slit film strips are identified in the drawing with prime numbers, where these guide rollers and elements are substantially identical to like elements identified with the processing of the film from supply roll 51. In a like manner, the components of the optical system for generating the second pair of laser beams 63 and 64 are identified with prime numbers, which correspond to like components employed to generate the first pair of laser beams 61 and 62.

Briefly, a film 102' is advanced from supply roll 52 about a tension sensing roller 106' to tangentially engage the periphery of the second highly polished stainless steel drum 57. There the metallized surface of the film is laser scribed by the pair of beams 63 and 64 to form line patterns 141' and 142' (see FIG. 9) which correspond to the line pattern shown in FIG. 1 and identified by the reference numeral 24. it should be noted that again the laser scribing action forms demetallized line sections 161' and 162' which are at the approximate midline positions of the film strips 76 and 77. These lines 161' and 162' will overlie the lines 161 and 162 on the other film strips 71 and 72 when the two sets of film strips are wound on the mandrel 91. In a like manner, demetallized lines 171' and 172' on strips 76 and 77 will overlie the lines 171 and 172 on strips 71 and 72 when these two sets of strips are wound on the mandrel. In addition, it should be noted that scribed lines 166' and 167' are formed in the opposed margin areas from the margin areas of scribed lines 166 and 167.

Figure 13:
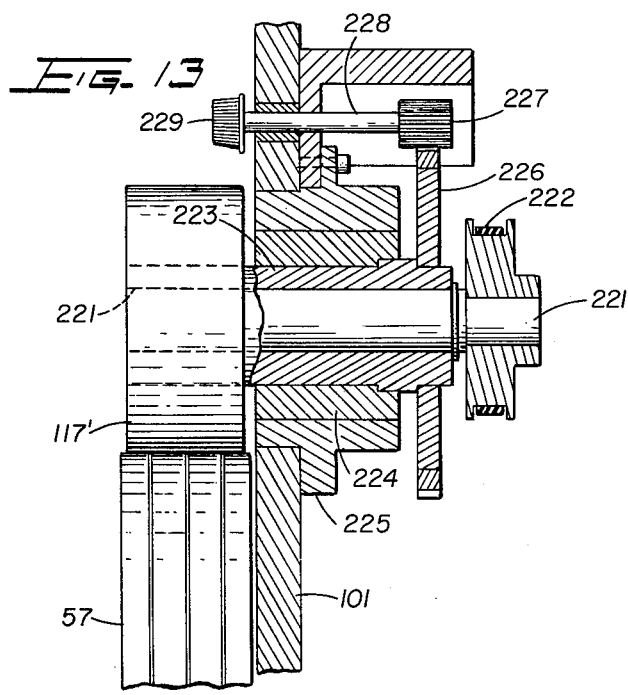
FIG. 13 is a partial cross-sectional view showing an eccentric facility for regulating the speed of rotation of one of the drums.

As shown in FIGS. 5, 7 and 13, the drum 57 is driven by a rubber-faced roller 117' secured to a shaft 221 which is rotated by a belt 222 that is driven by the motor 119. The shaft 221 extends through an eccentric 223 which is rotatably mounted in a bearing 224 which is secured in a seat 225 attached to the frame 101. The eccentric mounting of the shaft 221 and roller 117' provides a means for changing the distance between the axes of rotation between the roller 117' and the drum 57. Inasmuch as the roller 117' has a rubber facing, it can be compressed and, thus, moved toward and away from the axis of rotation of the drum 57 to vary the rate of feed imparted by the drum to the film strips 76 and 77 being advanced through the machine. This movement of the eccentric is attained by mounting a ring gear 226 on the eccentric and meshing the ring gear with a pinion 227 that is rotated through a shaft 228 by turning a handwheel 229.

There is a need to adjust the relative advancement of the two sets of scribed strips because strips 71 and 72 are wound in overlaying relationship to strips 76 and 77. It may be thus appreciated that strips 71 and 72 are wound with slightly larger diameters equal to twice the thickness of the film strips. The effects of these differences in the diameters of the wound convolutions are compensated for by adjusting the centerline position of the rubber-faced drive roller 117'. More particularly, the roller 117' is positioned closer to the axis of rotation of the drum 57 than the roller 117 is positioned with respect to the axis of rotation of the drum 56 and, as a result, the drum 57 will rotate at a slightly slower speed causing film strips 76 and 77 to be fed toward the winding mandrel at a slightly reduced rate of feed to the other film strips 71 and 72. This action compensates for the slight differences in radii between the convolutions of successive convolutions wound on the mandrel and, thus, normally maintains the tension balancing shuttle 201 (see FIG. 6) in a central position.

In order to maintain the desired relative advancement of the two sets of film strips, periodic observation is made of the position of the tension balancing shuttle 201. If the shuttle shifts to the extreme left-hand position, the drum 57 is rotating too fast causing the film strips 76 and 77 to be advanced at a too rapid rate to be taken up smoothly by the mandrel. To adjust the rate of feed of the film strips 76 and 77, the handwheel 229 (see FIG. 13) is turned to rotate the gears 227 and 226 and the eccentric 223 to move the rubber-faced roller 117' toward the centerline of the drum 57 whereupon the rotating roller 117' will drive the drum at a slower speed. If the observation reveals a shifting of the shuttle toward the right, indicating that the feed of the strips 76 and 77 is too slow, the handwheel 229 is turned in an opposite direction so that the centerline of the rubber-faced roller is moved away from the axis of rotation of the drum 57, and as a result the rubber-faced roller drives the drum at a higher speed to speed up the feed of the film strips 76 and 77, thereby restoring the tension balance shuttle to a central position.

The adjustment of the speed of the drum 57 may be made automatic by mounting a triangular shutter 231 (see FIG. 6) on the shuttle 201 so that this shutter controls the impingement of light on an analog photoresistive device 232. The output of the photoresistive device 232 may be used to control a servomotor and a mechanism (not shown) for driving a gear which would be substituted for the handwheel 229.

Figure 14:
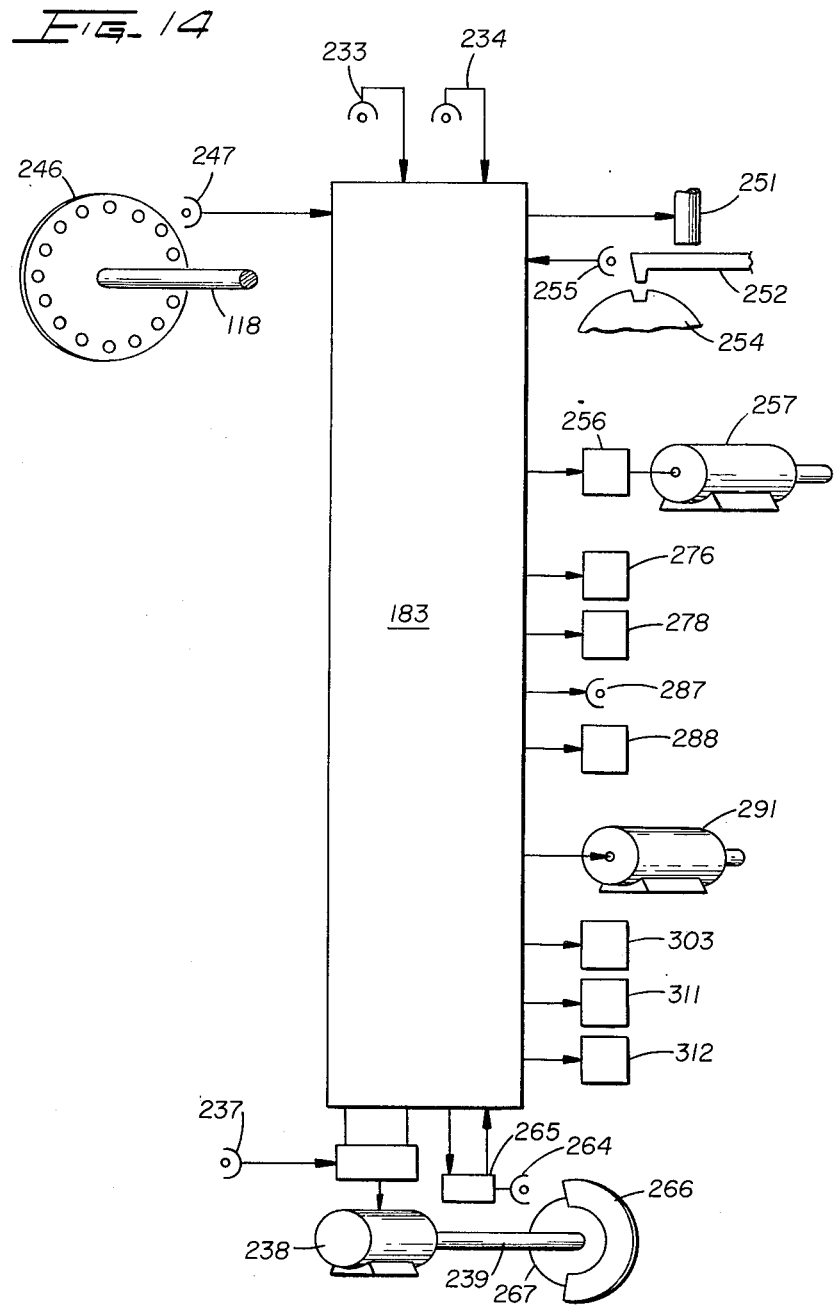
FIG. 14 is a schematic representation of a controller for monitoring certain of the components of the machine and for accordingly generating signals to control the machine.

Associated with the shuttle 201 is a pair of out-of-balance photosensitive devices 233 and 234 connected to the controller 183, see FIG. 14. In the case of severe unbalance in the tension between the two strips or a break in one of the strips, the shuttle will move over one or the other of the photosensitive devices to impart a signal to the controller 183 to interrupt further operation of the machine.

During the winding of the capacitor blanks on the mandrel 91, it is important to maintain the tension in the film strips at a substantially constant value. This is accomplished by detecting the position of the shuttle 207. The film strips 71 and 72 pass over the rollers 206, 209 and 212, while the film strips 78 and 79 pass over rollers 206', 209' and 212'. If the tension is maintained at a predetermined constant level, the shuttle will maintain a central position in the guideway 208 to position an angular shutter 236 over the center of a photosensitive resistive device 237. This photosensitive device impresses an analog signal on the controller 183 which, in turn, generates a signal that exercises servo control for a motor 238, see FIGS. 10 and 14, which is the drive motor for mandrels 91 and 92. This motor 238 rotates the mandrels 91 and 92 through a power train that may be traced through a drive shaft 239 keyed to a sun gear 241 that drives a pair of planet gears 242 and 243 which, in turn, slidably support and rotate the mandrels. It may be thus appreciated that the tension in the strips is maintained by sensing the position of the tension responsive device 87 responding to the tension in the strips and accordingly controlling the winding speeds of the mandrels because the drums 56 and 57 are rotating at a constant speed to feed the strips at a constant rate toward the winding mandrels.

Further, it will be noted that the arrangement of guide rollers on the shuttle 207 together with the associated stationary guide rollers allows these elements to function as a limited film strip accumulator; that is, by movement of the shuttle 207 toward the left, a small amount of strip material will be accumulated, whereas movement of the shuttle 207 toward the right dispenses additional film strip material toward the rotating mandrel.

The lengths of strips wound on a mandrel, such as mandrel 91, are controlled by counting a circular array of holes formed in a disc 246 (see FIGS. 7 and 14) which is mounted on the shaft 118 that is used to rotate the drive rollers 117 and 117'. A photodetector 247 counts the holes to provide an indication of the lengths of film strips advanced to be wound on the mandrel 91. The desired size of a capacitor blank is set by winding initially a few inches (several convolutions) of the strip with the scribed lines in overlaying relation, winding relatively long lengths of strip with the scribed lines in opposite margins of the strips to form the capacitor plates and set the capacitance value, and subsequently winding a few inches of strips with the scribed lines again in overlaying relation.

Each passage of the hole in the disc 246 is sensed by the photodetector 247 to generate and register a signal pulse in the controller 183. When a predetermined signal count is registered, indicative of the approaching completion of the windings of the capacitor blanks on the mandrels, a signal is generated by the controller and transmitted to solenoid controlled air cylinder 251 (see FIG. 12) associated with a pivotally mounted spring-biased latch 252 positioned within a first notch 253 formed in the periphery of a disc 254 secured to and rotatable with the turret 93. Energization of the solenoid controlled air cylinder 251 lifts the latch 252 to free the turret 93 for rotation. As the latch is lifted, a photodetector 255 senses the new latch position and applies a signal to the controller which responds to apply a signal to operate a clutch 256 (see FIG. 10) to apply rotative power from a normally energized turret index motor 257 through a belt 258 through the clutch 256 to a gear 259 that meshes with and drives a ring gear 260 secured to the turret 93. As a consequence, the turret rotates with the latch 252 riding on the periphery of the disc 254 until the latch drops into a second notch 261, at which time the photodetector 255 senses the new latch position to interrupt the signal applied to the controller, and as a result the energizing signal for the clutch 256 is interrupted and, thus, the turret stops.

Figure 12:
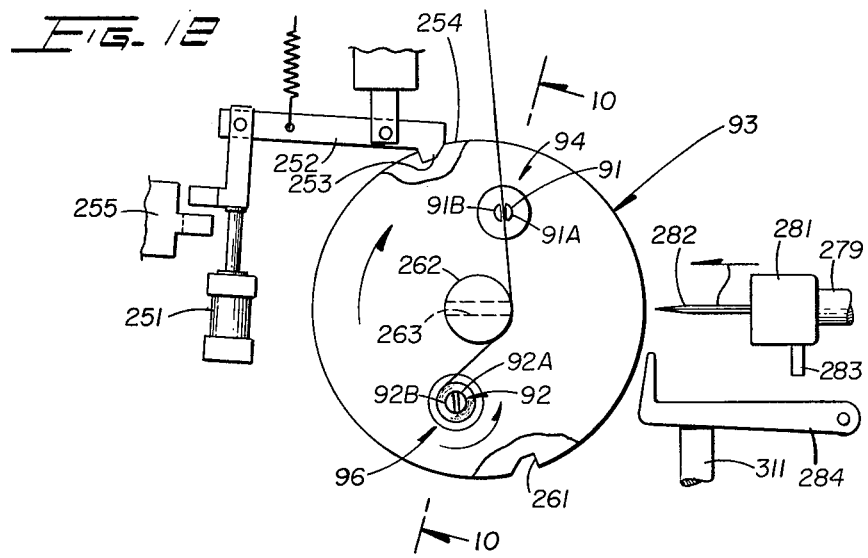
FIG. 12 is a elevation view of the turret which rotatably supports and orbits the mandrels with a specific showing of a slotted post for supporting the laser scribed film strips during a cutting operation.

The rotation of the turret orbits the film strip wound mandrel 91 from the winding position 94 to the discharge position 96 (see FIG. 12). During this orbiting movement, the trailing extremities of the film strips are moved against a post 262 (see also FIG. 10) having a slot 263 formed therein. After the turret orbits, the controller 183, actuated by the photodetector 255, transfers control of the energizing current supplied to the mandrel drive motor 238 from a servo condition, controlled by the photosensitive resistive device 237, to a fixed current condition which is effective to rotate the mandrels at a uniform slow rate of rotation.

At the start of this period of slow rotation of the mandrels 91 and 92, an optical detector 264 (see FIGS. 10, 11 and 14) is rendered effective by the controller 183 to monitor an arcuate light blocking cam shutter 266 formed on the periphery of a disc 267 secured to the mandrel drive shaft 239. The optical detector 264 is designed to be operated by a two step circuit 265 which is conditioned for subsequent operation only after first sensing the presence of light. When the photodetector 264 is conditioned for operation, the subsequent presentation of the leading end of the cam shutter to the optical detector results in generating a signal which is impressed on the controller which responds by interrupting the energizing circuit to the drive motor 238 which stops the rotation of the slowly rotating mandrels.

As the turret 93 rotates, one of halves 92A of the slowly rotating mandrel 92 is in an extended position while the other half is withdrawn into the turret. The mandrel halves of the mandrels 91 and 92 are slidably mounted in the turret 93 and are selectively withdrawn and advanced by the selective operation of a series of three air cylinders 272, 273 and 274 which are provided on the commercial E. W. Barton machine. The extended slowly rotating mandrel half 92A of the orbiting mandrel 92 engages the film strips and moves them slightly as it moves into the winding position 94. The design of the cam shutter 266 and the drive train for the mandrels is such that the subsequent presentation of the leading end to the conditioned optical detector 264 occurs at the same time that the diametric surface of the extended mandrel half 92A is in line with the film strips emanating from the guide rollers 218 and 218'. Manifestly, the subsequent or second sensing of the leading end of the shutter interrupts the rotation of the mandrels, with the diametric surface of the now stopped mandrel half 92A abutted against the film strips.

At the time that the optical detector 264 senses the subsequent presentation of the leading end of the cam shutter 266, the signal impressed on the controller 183 is also effective to apply an energizing signal to control the operation of the air cylinder 272 which responds by thrusting the mandrel half 92B forward to captivate the film strips between the mandrel halves in anticipation of winding the next pair of capacitor blanks.

When the turret completes its orbit and the optical detector 264 impresses a signal on the controller 183, the controller generates a further control signal which operates a solenoid controlled air cylinder 276 (see FIG. 5) which functions to pivot two pairs of holddown wires 277 into engagement with the wound film strips on the mandrel 91 which is now positioned at the discharge station 96. The pivotal mounting for the wires 277 is such that the wires move into tangential engagement with the wound films on the mandrel 91.

Also at this time, the controller 183 applies a further signal to operate a solenoid controlled air cylinder 278 (see FIG. 5) which has a piston rod 279 attached to a mount 281 for a serrated knife blade 282. Operation of the air cylinder 278 thrusts the mount 281 toward the left, as viewed in FIGS. 5 and 12, to move a stop 283 thereon into engagement with a pivotally mounted latch 284 as the edge of the knife blade 282 approaches the film strips spanned across the slotted post 262. The knife blade 282 is of sufficient width to cut the film strips. However, the knife blade is held by the latch in a position spaced from the film strips.

During the period of slow rotation of the mandrels, after the turret orbits, the excesses of film strips delivered by the constant speed rotating drums 56 and 57 are taken up by a leftward movement of the shuttle 207 (see FIG. 6) which is attached to a weight 286. Shortly after the diametric surface of the mandrel 92A is rotated into alignment with the film strips and the rotation of the mandrels is stopped, the shuttle 207 reaches an extreme leftward position to position the shutter over a photodetector 287. The photodetector impresses a signal on the controller 183 to cause the controller to apply a signal to a solenoid controlled air cylinder 288 which responds to raise a platform 289 to engage and lift the weight 286.

Simultaneously therewith, the controller generates a further signal to operate a motor 291 which functions to rotate a screw 292. Mounted on the screw 292 is a ball nut 293 having a projecting latch 294 that engages and normally holds the frame 193 of the accumulator 84 from upward movement under the urging of a weight 296. Rotation of the screw 292 is accompanied by an upward movement of the ball nut 293 and the latch 294 so that the weight 296 is rendered effective to apply a force to the accumulator frame 193 tending to move the frame in an upward direction.

The ball nut 293 is restrained from rotation with the screw 292 by a restraining slider 297 which rides in a vertically slotted channel member 298. Inasmuch as the feed drums 56 and 57 are continuing to advance the film strps and the mandrels are no longer rotating, the excesses of film strip are accumulated by the upward movement of the accumulator guie rollers 188, 191, 188' and 191'. The ball nut 293 is rapidly moved upward a sufficient distance to free the accumulator frame 193 and permit the frame to ride freely on guide posts 301 and 302 in response to the effect of the force of the weight 296 and the decreasing tension in the film strips strung over the rollers 188, 191, 188' and 191'.

Further, at this time the controller 183 is effective to generate an additional signal which operates a solenoid controlled air cylinder 303 (see FIG. 6). Operation of air cylinder 303 moves a piston rod 304 and an attached plate 306 upwardly toward braking rollers 197 and 197'. The plate has a pair of brake pads 307 and 308 which engage the film strips and force them against the braking rollers 197 and 197' thus preventing further advance of the film strips from the drums 56 and 57 to the winding turret 94.

As a result of the photodetector 287 impressing the control signal on the controller 183, the controller responds by generating a delayed signal which is applied to operate a solenoid 311 (see FIG. 5) associated with the latch 284. The generation of this signal is delayed by the controller for a period of time sufficient to enable the platform 289 to move upwardly to engage the weight 286 and, thus, relieve the tension imparted to the film strips by the weight-biased shuttle 207. The operation of the solenoid 311 withdraws the latch 284 and the pressurized air cylinder 278 thrusts the knife blade 282 through the film strips now spanned across the slot 263 formed in the post 262.

Following a delay necessary to enable the cutter to move forward and sever the film strips, the controller 183 functions to again supply steady energizing power for the motor 238 to rotate the mandrels 91 and 92 at a very slow rate. The initiation of rotation of the mandrels is followed by the controller 183 generating a control signal to operate a solenoid controlled air cylinder 312 (see FIGS. 5 and 14) having a piston rod attached to a pair of mounts 313 (see also FIG. 10) for a pair of heater units contained in the selectively operated heater device 97. The mounts 313 are slotted to accommodate the two pairs of wires 277 and, thus, permit the heater units to move against the outer convolutions of the film strips wound on the mandrel 91. As the mandrel 91 slowly rotates, the trailing extremities of the severed strip being wound on the capacitor blanks are held snugly by the wires 277 while the heater device 313 heat seals only the outer convolutions of the capacitor blank.

After the mandrels complete a predetermined number of slow turns (e.g., six), the controller responds by sequentially deenergizing the solenoid controlled air cylinders 276 and 312 to withdraw the heating device 97 and then the wires 277. Simultaneously therewith, the control of the mandrel drive motor 238 is switched from the fixed current condition back to the servo control mode.

During the period of slow rotation of the mandrels, the mandrel halves 92A and 92B span and captivate the film strips, and the mandrel 92 is effective to wind up the leading sections of the severed films. The shuttle 207 is in the leftward position and has thus accumulated a certain amount of films strips. The rotation of the mandrel 92 exerts tension on the accumulated film strips so that the accumulated film strips are wound together with the severed sections of film strips.

The winding up of the film strips accumulated by the leftward position of the shuttle 207 causes the shuttle to move toward the right to again move the shutter 236 over the analog output photoresistor device 237 which controls the current to mandrel drive motor 238 when this motor is operating in a servo mode. The slow revolutions of the mandrel are registered in the controller, and upon completion of the predetermined number of slow revolutions, the controller reverses the energizing circuits for the solenoid controlled air cylinders 288 and 303 and the motor 291. Air cylinder 288 restores the platform 289 to the down position and, thus, the weight, if not already released by the rightward movement of the shuttle, again acts against the tension in the film strips to position the shuttle 207. Air cylinder 303 restores plate 306 to the down position and, thus, releases brake pads 307 and 308 from engagement with the film strips.

At this time, accumulator weight 296 is still exerting a force on the accumulator 84 to tension the film strips being advanced by the constantly rotating drums 56 and 57. Accumulator weight 296 is designed to exert a slightly greater force on the film strips than the weight 286 connected to the shuttle 207. This weight differential allows the weight 296 to impart sufficient tension to the film strips so that the shuttle 207 is urged and maintained in the right-hand position when the weight 286 is freed by retraction of the platform 289.

When the latch 294 was moved upwardly to release the frame 193 of the accumulator 84, the latch moved quickly away from the frame a distance sufficient tht it did not engage the frame while the film strips were being accumulated by the slow upward movement of the accumulator rollers 188, 191, 188' and 191'. At the time that the latch 294 commences to move downward, the shuttle 207 is in the extreme right-hand position so that the shutter 236 completely blocks the photo-resistor 237. It will be recalled that when the mandrels 92 complete the predetermined number of turns, the controller responded by transferring the energizing circuit for the motor 238 back into a servo mode wherein the position of the shutter 236 with respect to the photoresistor 237 controls the speed of the motor. Inasmuch as the shutter 236 completely blocks the photoresistor 237, the motor 238 is not immediately energized to start the rotation of the mandrels.

When the latch 294 engages the accumulator frame 193, the effect of the weight 296 is removed from the film strips and, as a result, the weight 286 moves the shuttle 207 toward the left to move the shutter 236 to commence exposure of the photoresistor 237. By now, due to the excessive amount of film strip being pushed toward the mandrel by the rotating drive drums 56 and 57 and the downwardly moving accumulator 86, the shuttle moves toward the left to expose the photoresistor 237, whereupon the servomotor 238 reacts to rapidly accelerate the mandrel 92 to commence winding of a new pair of capacitor blanks. As the film strips are taken up by the rotating mandrel 92, the shuttle 207 moves back to its normal tension controlled position with the shutter 236 partially overlaying the photoresistor 237. Variations in the amount of film available in the two sets of film strips cause the shuttle 207 to move back and forth to vary the position of the triangular shutter 236 with respect to the photoresistor 237 to thereby control the signal impressed on the controller 183 and, hence, the energizing current for the servomotor 238 which rotates the mandrels.

Returning now to a consideration of the wound and sealed capacitor blanks now in the discharge station 96, the completion of the predetermined number of slow rotations of the mandrels is accompanied by the controller 183 sequentially deenergizing the air cylinders 312, 278, 311 and 276. As a result, the heater device 97 is withdrawn, the knife blade 282 is withdrawn, the latch 284 is restored to its latching position and the wires 277 are withdrawn from engagement with the capacitor blank. Next, the controller sequentially operates the air cylinders 273 and 274 to sequentially withdraw the mandrels 91A and 91B to strip the wound pair of capacitor blanks which thereupon drop into the discharge chute 98.

A further appreciation of the timing of operation of the various component mechanisms of the overall machine may be had by referring to FIG. 15. It will be noted that the time of operation of the optical detector 264, which functions to control the the stopping of the extended mandrel with its diametric surface flush with the film strips being advanced to the winding station 94, will vary slightly from cycle to cycle due to the random rotational displacement of the mandrels when the turret excerises 180° rotation and the optical detector 264 is sensing the cam shutter 266 on the mandrel drive shaft 239. This variation in operation of the optical detector is depicted by the line hatched box in timing line 264.

In a situation where an extremely thin film is utilized and there are added possibilities of breakage, the feed of the film strips may be further assisted by applying air motor drives to certain of the guide rollers, such as guide rollers 204 and 204'.

The machine snugly winds each capacitor blank with a substantially uniform tension being imparted to each convolution of each film strip as it is wound on the mandrel. This is made possible by setting the eccentric 223 so that the drum 57 rotates at a slightly slower rate than drum 56 to compensate for the slightly larger convolutions of wound strip 71 or 72 with respect to the convolutions of wound strip 76 or 77. The setting of the eccentric 223 is such that the tension balancing shuttle 86 will be in a right-hand position as the initial convolutions are being wound. As the capacitor blank is wound, the balancing shuttle will shift slightly to the left to balance the tension in the strips. The setting of the eccentric is such that the drums fed the strips at a slightly different but constant rates of speed so that the difference in the rates of speed compensates for the average differences in diameters of the adjacent convolutions of the two wound strips.

The capacitance value of the wound capacitor blanks may be varied by moving the scribed lines 166 and 167 closer together with the scribed lines 166' and 167'. This may be easily accomplished by inserting shims in the slotted blicks 182 and 182' which control the extent of reciprocation of the slides 174 and 174'. In the alternative, small changes may be made in the capacitance value by setting the controller 183 to initiate the start of the diverted scribed lines 163, 164, 163' and 164' at a different time. Obviously, similar changes in capacitance may be introduced by setting the controller to change the time of initiation and duration of the scribed lines 168, 169, 168' and 169'.

With the described machine it is possible to wind very thin and narrow strips into capacitor blanks that are of uniform geometric size and capacitance value. The capacitor blanks thus produced may be readily terminated and inserted in small plastic boxes similar to those used in the well-known DIP (Dual-In-Line Package) configuration.

What is claimed is:

1. A winding apparatus, which includes:
    a pair of physically displaced, separate means for applying advancing forces to a pair of strips of material;
    a mandrel for simultaneously winding the pair of strips with one strip overlaying the other;
    means for guiding said strips from said force applying means to the mandrel;
    means for rotating the mandrel to apply forces to said strips which take up the strips; and
    means for setting the separate force applying means to advance the strips at different rates of advance to compensate for the differences in diameters of the successive convolutions of the pair of wound strips.

2. A winding apparatus as defined in claim 1, which includes:
    means responsive to a difference in the tension applied to the respective strips by the winding mandrel for indicating such difference.

3. A winding apparatus as defined in claim 1, which includes:
    means for adjusting said force applying means to adjust the rate of feed of at least one of said strips.

4. A winding machine, which includes:
    a mandrel;
    a pair of drums;
    means for guiding a pair of strips over portions of the surfaces of said drums;
    means for forcing the strips against the surfaces of said drums;
    means for guiding the strips emanating from the surfaces of said drums to said mandrel;
    means for rotating the mandrel to wind successive convolutions of a first strip on successive convolutions of the second strip wherein the first convolutions are larger than the second convolutions;
    means for driving the drums at different constant speeds to advance the strips at different rates of speed toward said guiding means so that the difference in the rate of speeds compensates for the average differences in the diameters of each inner convolution of one wound strip with respect to each overlaying convolution of the other strip.

5. A winding machine, which includes:
    a mandrel for winding convolutions of strip material;
    a drum;
    first means for guiding the strip material to pass over a first portion of the peripheral surface of said drum;
    a pinch roller for forcing the strip against the peripheral surface of the drum;
    means for performing a work operation on the strip material passing over the drum;
    a drive roller engaging a second portion of the peripheral surface of said drum;
    second means for guiding the strip emanating from the peripheral surface of the drum to said mandrel;
    means for rotating the drive roller to urge the strip to advance through the second guide means; and
    means for rotating the mandrel to take up and wind the strip with a constant tension.

6. A winding machine, which includes:
    a pair of drums;
    means for guiding a pair of strips over and into engagement with portions of the peripheries of the respective drums;
    a tension responsive slide;
    means for urging the slide to move in a predetermined direction;
    two pairs of guide rollers on the slide for receiving and guiding said pair of strips;
    means for rotating the pair of drums to urge the strips toward said guide rollers;
    a pair of rollers rotatably mounted on stationary axes for guiding each strip from a first roller of each pair to the second roller of each pair; and
    means for simultaneously winding both strips emanating from the second rollers of each pair to impart a tension to the strip and apply forces to said guide rollers and said slide against the effect of said urging means.

7. A winding machine as defined in claim 6, which includes:
    means for varying the speed of said winding means; and
    means responsive to a change in tension imparted to strips and a consequent movement of said slide for accordingly varying the speed of said winding means to maintain a predetermined tension imparted to said strips.

8. A winding machine as defined in claim 6, which includes:
    means responsive to a predetermined movement of said slide for applying a braking force to said strips to preclude further feed of said strips to said guide rollers.

9. A winding machine as defined in claim 8, which includes:
    an accumulator interposed between said drums and said guide rollers for accumulating said strips emanating from said drums upon application of said braking forces.

10. A winding apparatus, which includes:
    a drum;
    means for guiding a sheet of material over a portion of the periphery of said drum;
    means for forcing the sheet against the periphery of the drum;
    means for slitting the sheet passing over the periphery of said drum into at least two strips;
    a mandrel;
    means for guiding a first of the strips to said mandrel;
    means for rotating said mandrel to wind said first strip;

means for receiving a second one of said strips;
means for guiding the second strip to said receiving means; and
means for driving said drum to advance said slit strips toward said mandrel and said receiving means.

11. A winding apparatus, as defined in claim 10, wherein the receiving means includes means for applying a force to the second strip to advance the second strip to the receiving means.

12. A winding machine for strip material, which includes:
a drum having the strip material running over a portion of the peripheral surface thereof;
means for forcing the strip material against the peripheral portion of the drum;
means for rotating the drum at a constant speed to impart a force to the strip material leaving the peripheral surface of said drum;
a mandrel for winding convolutions of the strip material;
an array of rollers for guiding the strip material from the drum to said mandrel; and
means for rotating the mandrel at a speed sufficient to maintain constant the tension in the strip material as the material is wound on the mandrel.

13. A winding machine as defined in claim 12, which includes:
a frame mounted for movement and providing a support for a pair of said rollers;
means for rotatably mounting another one of said rollers on a stationary axis whereupon said one roller cooperates with said pair of rollers to form an accumulator for the strip material;
releasable means for holding said frame from movement;
means responsive to a predetermined decrease in tension in the strip material for releasing said holding means; and
means rendered effective upon release of said holding means for moving said frame to accumulate strip material between said pair of frame mounted rollers and said stationary mounted roller.

14. A winding machine, as defined in claim 13, which includes:
a braking member spaced from another designated one of said guide rollers; and
means actuated by said tension response means ascertaining said predetermined decrease in tension for moving said braking member to force the strip against said designated one of said guide rollers during movement of said frame.

15. A winding machine, as defined in claim 13, which includes:
means for slitting the strip material passing over said engaged portion of the peripheral surface of said drum;
means for receiving and collecting one section of said slit strip material; and
means mounting another pair of said rollers for engaging and directing said one section of said slit strip material to said receiving and collecting means while the other slit strip is directed to said accumulator.

16. A winding machine, as defined in claim 5, which includes:
means responsive to variations in tension applied to the strip material for accordingly varying the speed of rotation of the mandrel to maintain the constant tension in the strip material being wound on the mandrel.

17. A winding machine, as defined in claim 5, which includes:
a knife for severing the strip material being wound on the mandrel;
means operated by said drive roller driving means for generating a signal indicative of a predetermined length of strip material passed over the drum; and
means actuated by said signal for moving the knife to sever the strip material.

* * * * *